(No Model.) 2 Sheets—Sheet 2.
J. COCHRANE.
DEVICE FOR PROPELLING VESSELS.
No. 432,864. Patented July 22, 1890.
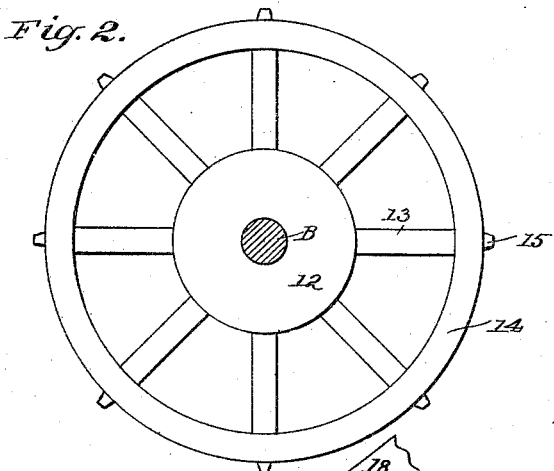
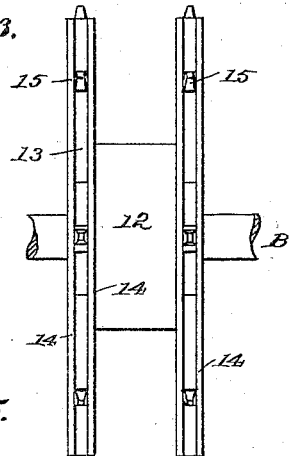
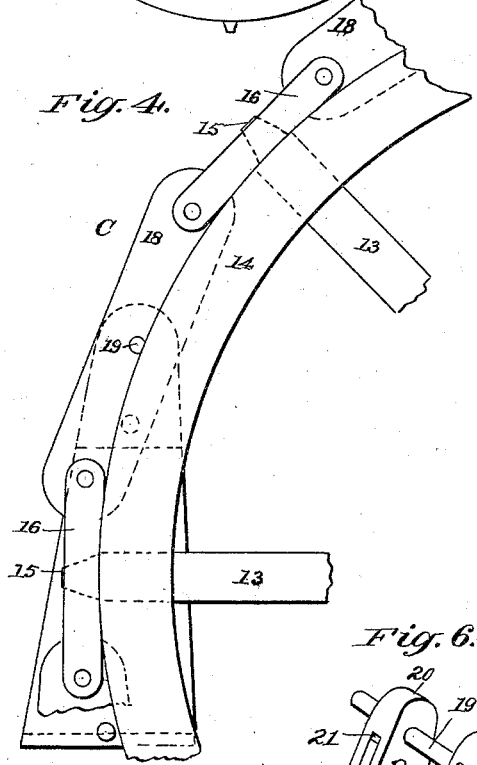
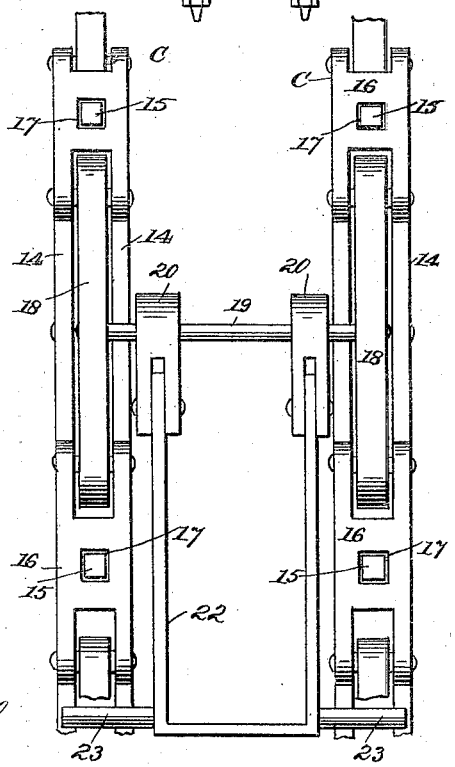
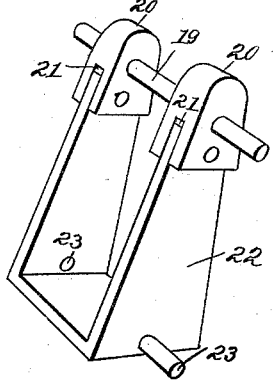
WITNESSES:
INVENTOR: J. Cochrane
BY Munn & Co.
ATTORNEYS

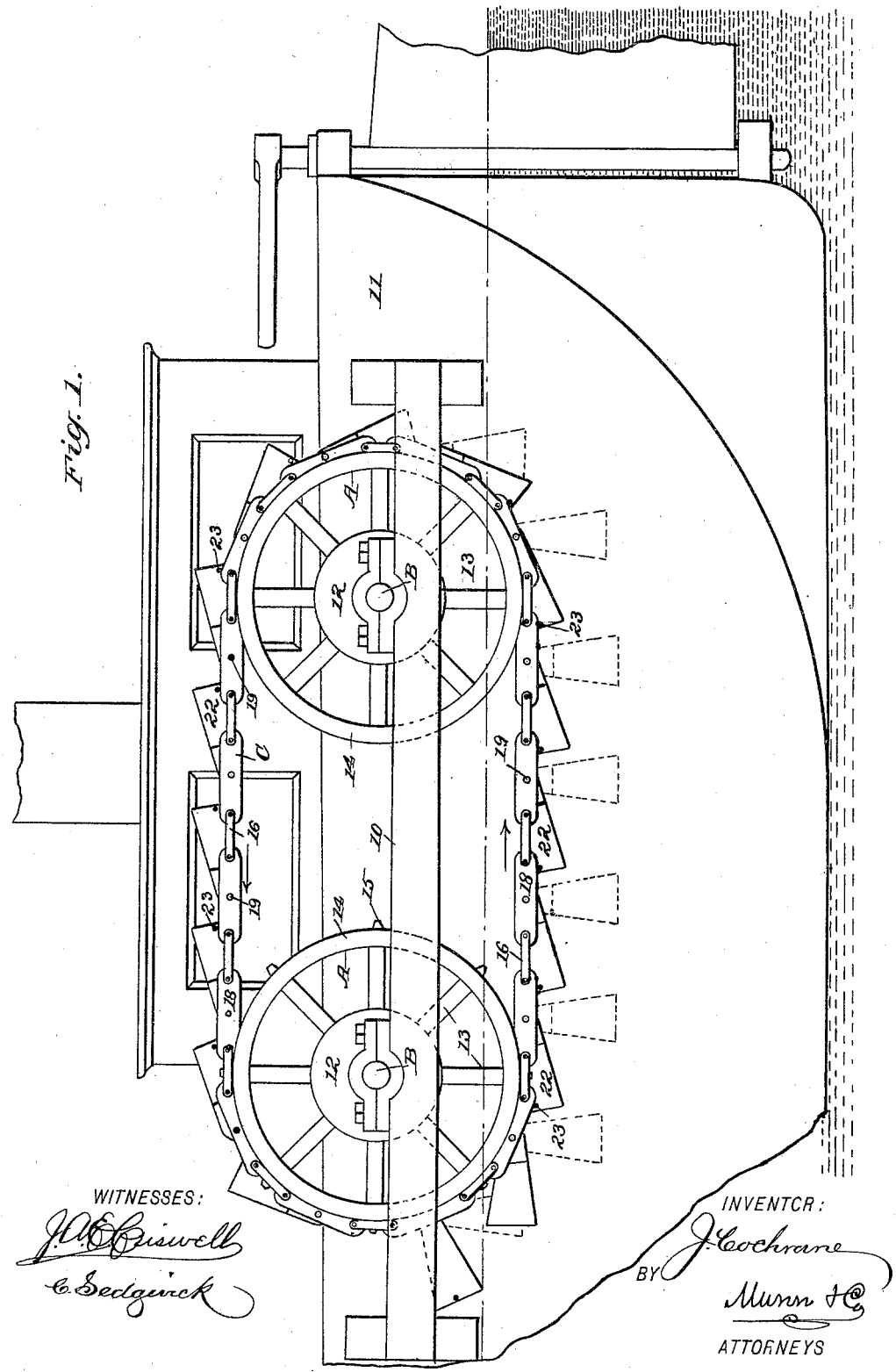

UNITED STATES PATENT OFFICE.

JACOB COCHRANE, OF HILL CITY, SOUTH DAKOTA, ASSIGNOR TO HIMSELF AND ABEL ARMSTRONG, OF SAME PLACE.

DEVICE FOR PROPELLING VESSELS.

SPECIFICATION forming part of Letters Patent No. 432,864, dated July 22, 1890.

Application filed April 1, 1890. Serial No. 346,146. (No model.)

*To all whom it may concern:*

Be it known that I, JACOB COCHRANE, of Hill City, in the county of Pennington and State of South Dakota, have invented a new and useful Device for Propelling Vessels, of which the following is a full, clear, and exact description.

My invention relates to an improvement in devices for propelling vessels, especially light-draft vessels, and has for its object to provide a series of buckets used in connection with endless chains and chain-wheels, which will automaticatically reverse as the engine is reversed and present an equal bearing-surface to the water, whether the vessel is driven ahead or backed.

Another object of the invention is to so construct the buckets that they will act to propel the vessel immediately upon entering the water, and when leaving the same not lift any dead-water, thereby economizing in power, and to provide for a further economy in power by rendering the buckets readily detachable, so that the number may be lessened when occasion may demand, and wherein, when the engines are started, the buckets will immediately act upon the water.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a partial side elevation of a vessel having my invention applied. Fig. 2 is a side elevation of one of the chain-wheels with the shaft in section. Fig. 3 is an edge view of the said chain-wheel. Fig. 4 is an enlarged view of a portion of the periphery of one of the chain-wheels, illustrating a section of the chain in contact therewith. Fig. 5 is a plan view of a segment of the chain-wheel, and a plan view of a portion of the chain in contact therewith, illustrating also the position of the buckets with respect to the wheel; and Fig. 6 is a detail perspective view of a bucket.

A guard 10 of any approved construction is attached to the sides of the vessel 11, and in each guard, and likewise in the sides of the vessel adjacent thereto, two shafts B are journaled in any suitable or approved manner, on which shafts are mounted two chain-wheels A. Each of the chain-wheels consists of a hub 12, provided with two sets of spokes 13, one set being made to radiate from each side of the hub. The said spokes are attached near their outer ends to a suitable felly 14, and the spokes may be braced or strengthened by any number of rings attached to the outer or inner faces thereof, or both, said rings being located between the felly and the hub. The spokes 13 project somewhat beyond the center of the felly, and the projecting ends are beveled upward, preferably on the four sides, as illustrated at 15 in Figs. 2 and 3.

An endless chain C is made to pass in contact with the outer section of each wheel A; thus two spaced chains are carried by the said wheels, and each endless chain is constructed of a series of links pivotally connected, each alternate link 16 being provided with a central opening or aperture 17 to receive the projecting ends 15 of the spokes, while the other links 18 are made solid. The solid links 18 drop down between the fellies of the wheel-sections, the said sections consisting of two opposed rings or bands, as shown in Fig. 3, and the apertured links 16 are of sufficient width to rest upon the fellies, as best shown in Fig. 5.

The solid links of the chain belts are connected by transverse bars 19, and upon each bar, between the endless chains, two lugs 20 are secured. In one edge of each of said lugs a slot 21 is produced, and into the slots of the lugs 20 the extremities of the members of stirrup-shaped buckets 22 are introduced and secured. One stirrup-shaped bucket is carried by each of the transverse bars 19. Thus it will be readily observed that the several buckets are pivoted between the chain belts, and that each bucket is independent of any other.

The buckets are of less width than the space between the endless chains, so that they are capable of passing between said chains, and in order to prevent this or limit the distance they shall drop through the connected chain belts when they are in their upper horizontal position (illustrated in Fig. 1) a pin 23 is projected through each side of each stirrup at its lower or closed end, which pins contact with the outer edge of the solid links of the chain, as shown in Fig. 5.

The shafts upon which the wheels A are secured are connected in any suitable or approved manner with the engines of the vessel. It will be observed that as the wheels are revolved the chain belts are revolved also, by reason of the projecting ends of the spokes of the wheels passing up through the apertures of each alternate link; and it will be also observed that when the wheels are revolved and the lower buckets are in the water they will assume an essentially horizontal position, and by reason of their pivotal connection with the chain belts they are reversed by the water the very instant that the engines reverse the revolution of the wheels. When the wheels A are at rest, the lower buckets hang perpendicularly downward, as illustrated in dotted lines, Fig. 1.

The buckets give the same power in backing the vessel that they do in propelling it, and the buckets at no time offer any resistance to the boat's headway, as in entering the water they do not strike it with a flat surface, as the buckets of a common paddle-wheel do, which action tends to raise the boat rather than to propel it; but instead of this these buckets present their edge to the water upon entering it, and therefore enter the water very silently; and as they assume at once a substantially horizontal position they immediately take part in the propulsion of the boat. As the buckets gradually cease propelling and commence to rise out of the water, instead of lifting up dead-water, as the paddle-wheel does, thus wasting a great amount of power, they present their feather-edge to the water and slip out empty without resistance. The number of buckets in the water is at all times sufficient to propel the boat ahead without slipping; and as they enter the water and come out of it without creating any disturbance the boat is propelled with no more displacement of the water than is usually caused by an ordinary canal-boat. Therefore this form of propelling may be used in canals with great advantage, as it will not wash the banks. It will be further observed that the buckets are separated and independent of one another, and that they may be quickly and easily detached and replaced. For example, should the vessel be running without a cargo, every alternate bucket may be detached, thus causing less friction and greatly economizing in fuel.

I desire it to be understood that although special construction has been shown and described, equivalent constructions may be employed without departing from the spirit of the invention—as, for instance, the links of the endless-chain-belt sections 18 may be constructed essentially diamond-shaped to resemble, essentially, the walking-beam of an engine, and the spoke-sections of the wheel may be braced laterally.

Having thus described my invention, I claim as new and desire to secure by Letters Patent—

1. In a propelling device for boats, the U-shaped reversible swinging bucket 22, having pivots at its inner open end and stops 23 at opposite sides of its closed end, substantially as set forth.

2. In a device for propelling boats, the U-shaped reversible swinging bucket 22, having stops 23 at the sides of its closed end, lugs 20 on the free ends for connection with an endless carrier of the sides of the bucket, and having apertures to receive the pivot-bar 19, said bar being adapted for connection with an endless carrier, substantially as set forth.

3. In a device for propelling boats, the combination, with chain-wheels and endless chains carried by said wheels, of stirrup-like buckets pivoted at their inner ends to the endless chains, the outer ends of the buckets being free to swing in either direction to permit them to automatically reverse, substantially as shown and described, and for the purpose specified.

4. In a device for propelling boats, the combination, with chain-wheels and endless-chain belts carried by said wheels, of stirrup-like buckets pivoted at their inner ends between the endless chains, and provided with stop-pins at their sides near their outer swinging ends to limit the movement of the outer free ends of the buckets, substantially as as shown and described.

5. In a device for propelling boats, the combination, with chain-wheels having spurs formed thereon, a peripheral recess between each spur, and chain belts carried by the said wheels, comprising a series of pivoted links, each alternate link being provided with an aperture to receive the spurs of the wheels, the other links being solid and adapted to enter the recesses between the spurs, of cross-bars connecting the solid links of the chain belts, and stirrup-like buckets detachably attached to the said bars and provided with stop-lugs at their sides, substantially as shown and described, and for the purpose specified.

6. In a device for propelling boats, the combination, with endless belts and means for revolving said belts, of stirrup-like buckets pivoted between the links of the belts, whereby the said buckets are free to turn in direction of either the front or the rear of the vessel and act upon the water to propel the said vessel forward or to back the same, substantially as shown and described.

JACOB COCHRANE.

Witnesses:
CHAS. MARKS,
L. C. FARIS.